(12) United States Patent
Peisa et al.

(10) Patent No.: US 11,849,017 B2
(45) Date of Patent: Dec. 19, 2023

(54) PROTOCOL SYNCHRONIZATION FOR HARQ

(71) Applicant: TELEFONAKTIEBOLAGET LM ERICSSON (PUBL), Stockholm (SE)

(72) Inventors: Janne Peisa, Espoo (FI); Michael Meyer, Aachen (DE); Johan Torsner, Kyrkslätt (FI); Stefan Parkvall, Bromma (SE); Magnus Stattin, Upplands Väsby (SE); Mats Sågfors, Kyrkslätt (FI)

( * ) Notice: Subject to any disclaimer, the term of this patent is extended or adjusted under 35 U.S.C. 154(b) by 289 days.

(21) Appl. No.: 17/301,424

(22) Filed: Apr. 2, 2021

(65) Prior Publication Data
US 2021/0226765 A1 Jul. 22, 2021

Related U.S. Application Data

(63) Continuation of application No. 16/022,832, filed on Jun. 29, 2018, now Pat. No. 10,992,448, which is a (Continued)

(30) Foreign Application Priority Data
Oct. 9, 2006 (SE) .................................... 0602182-8

(51) Int. Cl.
*H04L 7/00* (2006.01)
*H04L 1/1867* (2023.01)
(Continued)

(52) U.S. Cl.
CPC .............. *H04L 7/0079* (2013.01); *H04L 1/08* (2013.01); *H04L 1/1607* (2013.01);
(Continued)

(58) Field of Classification Search
CPC ....... H04L 7/0079; H04L 1/08; H04L 1/1607; H04L 1/1812; H04L 1/1887; H04L 69/324; H04W 56/001
See application file for complete search history.

(56) References Cited

U.S. PATENT DOCUMENTS 10,033,522 B2 7/2018 Peisa et al.
10,992,448 B2 * 4/2021 Peisa ..................... H04L 7/0079
(Continued)

FOREIGN PATENT DOCUMENTS

EP 1557968 B1 2/2009
WO 03096567 W 11/2003
(Continued)

OTHER PUBLICATIONS

3rd Generation Partnership Project; Technical Specification Group Radio Access Network; Physical layer aspects for evolved Universal Terrestrial Radio Access (UTRA) (Release 7) 3GPP TR 25.814 V7.0.0 (Jun. 2006).
(Continued)

*Primary Examiner* — Chi H Pham
*Assistant Examiner* — Weibin Huang

(57) ABSTRACT

A method and apparatus according to the present invention addresses and/or prevents lost protocol synchronization in HARQ systems caused by ACK/NACK errors. One embodiment detects lost synchronization errors for NDI-based retransmission protocols and restores synchronization by sending an explicit RESET message. In response to the RESET message, the transmitter aborts the transmission of a current PDU and transmits a new PDU and corresponding NDI. Another embodiment prevents protocol synchronization errors by sending scheduling grants on a packet by packet basis. The receiver sends a subsequent explicit scheduling grant to the transmitter based on an error evaluation of
(Continued)

a received PDU. The transmitter will not send the next PDU unless it receives the subsequent explicit scheduling grant.

11 Claims, 10 Drawing Sheets

Related U.S. Application Data continuation of application No. 15/267,773, filed on Sep. 16, 2016, now Pat. No. 10,033,522, which is a continuation of application No. 13/920,467, filed on Jun. 18, 2013, now Pat. No. 9,485,059, which is a continuation of application No. 12/444,915, filed as application No. PCT/SE2007/050721 on Oct. 9, 2007, now Pat. No. 8,489,951.

(51) Int. Cl.
| | |
|---|---|
| *H04L 1/08* | (2006.01) |
| *H04L 1/1607* | (2023.01) |
| *H04L 1/1812* | (2023.01) |
| *H04W 56/00* | (2009.01) |
| *H04L 69/324* | (2022.01) |

(52) U.S. Cl.
CPC .......... *H04L 1/1812* (2013.01); *H04L 1/1887* (2013.01); *H04W 56/001* (2013.01); *H04L 69/324* (2013.01)

(56) References Cited

U.S. PATENT DOCUMENTS

| | | | | |
|---|---|---|---|---|
| 2003/0099211 A1* | 5/2003 | Moulsley | ............ | H04W 52/50 370/328 |
| 2004/0170192 A1 | 9/2004 | Herrmann | | |
| 2004/0223507 A1 | 11/2004 | Kuchibhotla et al. | | |
| 2006/0195767 A1* | 8/2006 | Ihm | ............ | H04L 1/0656 714/776 |
| 2007/0115894 A1* | 5/2007 | Herrmann | ............ | H04L 1/1607 370/338 |
| 2007/0250751 A1* | 10/2007 | Cai | ............ | H04L 1/008 714/748 |
| 2008/0026741 A1* | 1/2008 | Nakamata | ............ | H04L 1/1835 455/420 |
| 2008/0045255 A1 | 2/2008 | Revel et al. | | |
| 2008/0056182 A1* | 3/2008 | Usuda | ............ | H04L 1/1812 370/329 |
| 2008/0081651 A1* | 4/2008 | Kuroda | ............ | H04L 1/1896 455/509 |
| 2008/0298387 A1 | 12/2008 | Lohr et al. | | |
| 2010/0157916 A1* | 6/2010 | Kim | ............ | H04L 1/1671 370/329 |

FOREIGN PATENT DOCUMENTS

| | | | | |
|---|---|---|---|---|
| WO | 2005006640 A1 | 1/2005 | | |
| WO | WO-2005006640 A1 * | 1/2005 | ............ | H04L 1/1607 |

OTHER PUBLICATIONS

Ericsson. Comparison between single and two-layer ARQ for LTE. 3GPP TSG-RAN WG2 #48. Tdoc R2-052057. Aug. 29-Sep. 2, London, UK.
Ericsson. E-UTRA Downlink Control Signaling—Text Proposal. 3GPP Draft; R1-060996, 3rd Generation Partnership Project (3GPP),Mobile Competence Centre; 650 Route des Lucioles; F-06921 Sophia-Antipolis Cedex; France vol. RAN WG1, No. Athens, Greece, 20060325, Mar. 25, 2006.
Ericsson. Handling of HARQ retransmissions for LTE uplink. TSG-RAN WG2 Meeting #58bis, Tdoc R2-072580. Orlando, US, Jun. 25-29, 2007.
Ericsson. NDI or RSN?. 3GPP Draft; R2-074050 NDI or RSN, 3rd Generation Partnership Project (3GPP), Mobile Competence Centre; 650 Route des Lucioles; F-06921 Sophia-Antipolis Cedex; France, vol. RAN WG2, No. Shanghai, China. Oct. 2, 2007.
Ericsson. NDI-less HARQ operation. 3GPP Draft; R2-070057, 3rd Generation Partnership Project (3GPP), Mobile Competence Centre; 650 Route des Lucioles; F-06921 Sophia-Antipolis Cedex; France val. RAN WG2, No. Sorrento, Italy; 20070112, Jan. 12, 2007.
Ericsson. NDI-less HARQ operation. 3GPP TSG-RAN WG2 #56. Tdoc R2-063235. Riga, Latvia, Nov. 6-10, 2006.
Ericsson. Problems of Persistent Scheduling. 3GPP TSG-RAN WG2 #56. Tdoc R2-063217. Riga, Latvia, Nov. 6-10, 2006.
Ericsson. Scheduling for maximizing VoIP capacity. TSG-RAN WG2 Meeting #56. Tdoc R2-063216. Riga, Latvia, Nov. 6-10, 2006.
Ericsson. Uplink data-associated control signaling. TSG-RAN WG1 #46bis. R1-062869 Seoul, Korea, Oct. 9-13, 2006.
Ericsson. Uplink HARQ operation without data-associated control signaling. 3GPP Draft; R2-072564, 3rd Generation Partnership Project (3GPP),Mobile Competence Centre; 650 Route des Lucioles; F-06921 Sophia-Antipolis Cedex; France vol. RAN WG2, No. Orlando, USA; 20070622, Jun. 22, 2007.
Ericsson. Uplink Non-data-associated Control Signaling. TSG-RAN WG1 LTE AdHoc. R1-061862. Cannes, France, Jun. 27-30, 2006.
Herrmann et al. Improving packet loss probability in the UMTS high-speed downlink. Vehicular Technology Conference, 2003. VTC 2003-Fall. 2003 IEEE 58th, vol. 4, pp. 2655-2659, Oct. 6-9, 2003 Retrieved from: http://ieeexplore.ieee.org/ie5/9004/28571/01286038. B. Error Case II. Error Recovery Procedure abstract.
Huawei. Scheduling information re-transmission and retriggering. 3GPP Draft; R2-062148 Scheduling Information Retransmission and Re-Triggering (CR 25.321 R6), 3rd Generation Partnership Project (3GPP), Mobile Competence Centre ; 650, Route des Lucioles; F-06921 Sophia-Antipolis Cedex; France, vol. TSG RAN, No. Tallinn, Aug. 23, 2006.
Huawei. Scheduling information re-transmission and retriggering. EPO Form 1703 01.91TRI 3GPP Draft; R2-062149 Scheduling Information Retransmission and Re-Triggering (CR 25.321 R7), 3rd Generation Partnership Project (3GPP),Mobile Competence Centre ; 650 Route des Lucioles; F-06921 Sophia-Antipolis Cedex; France vol. TSG RAN, No. Tallinn, Aug. 23, 2006.
ITRI. An efficient detection scheme to identify residual HARQ errors. 3GPP TSG-RAN WG2 ad-hoc on LTE. Tdoc R2-061857 Cannes, France, Jun. 27-30, 2006.
Vodafone, et al. E-UTRA physical layer framework for evaluation. 3GPP TSG-RAN1 #45. R1-06-1118. May 8-12, 2006 Shanghai, China.

* cited by examiner

PROTOCOL SYNCHRONIZATION FOR HARQ

This application is a continuation of U.S. application Ser. No. 16/022,832, filed on Jun. 29, 2018, which is a continuation of U.S. application Ser. No. 15/267,773, filed on Sep. 16, 2016, granted as U.S. Pat. No. 10,033,522 on Jul. 24, 2018, which is a continuation of U.S. application Ser. No. 13/920,467, filed on Jun. 18, 2013, granted as U.S. Pat. No. 9,485,059 on Nov. 1, 2016, which is a continuation of U.S. application Ser. No. 12/444,915, filed Apr. 9, 2009, granted as U.S. Pat. No. 8,489,951 on Jul. 16, 2013, which was the National Stage of International Application No. PCT/SE2007/050721, filed Oct. 9, 2007, which claims the benefit of Swedish Application No. 0602182-8, filed Oct. 9, 2006, the disclosure of which is incorporated herein by reference.

BACKGROUND

The present invention relates to automatic retransmission protocols, and more particularly to improved link layer protocol synchronization associated with automatic retransmission protocols.

The purpose of a wireless communication system is to successfully transmit information from a transmitter to a receiver over a communication channel. In wireless communication systems, bit errors occur during transmission due to noise and multi-path fading. A variety of error control techniques are available for combating transmission errors and reducing bit errors. The hybrid automatic repeat request (HARQ) protocol, which combines ARQ with forward error correction (FEC), represents one exemplary error control technique. ARQ adds redundant bits or check bits to a protocol data unit (PDU) to enable detection of errors at the receiver. If the receiver detects errors in the received PDU, the receiver may send a feedback message, (e.g., a NACK) on a control channel that request a repeat transmission of the PDU. FEC uses error-correcting codes to combat errors by adding redundancy to the PDU before it is transmitted. The added redundancy enables the receiver to detect and correct most errors that occur during transmission.

While HARQ provides robustness against link adaptation errors for high-speed downlink packet access (HSDPA) channels and enhanced uplink channels, problems may occur when the feedback message is erroneously interpreted by the transmitter. Such interpretation errors may lead to residual errors after HARQ operations. Further, such interpretation errors may lead to the loss of link layer protocol synchronization between the transmitter and receiver. For example, if the transmitter misinterprets a NACK associated with a PDU as an ACK, the transmitter will transmit a new protocol data unit (PDU) instead of retransmitting the previous PDU. Because the receiver does not receive the expected retransmission, the receiver loses link layer protocol synchronization with the transmitter. Further, combining errors may occur at the receiver when the receiver soft combines different PDUs, and attempts to decode the soft combination. It is therefore desirable to reduce the effects of feedback message errors.

SUMMARY

One embodiment of the present invention detects lost synchronization errors for NDI-based retransmission protocols and restores synchronization by sending an explicit RESET message. In response to the RESET message, the transmitter aborts the transmission of a current PDU and transmits a new PDU and corresponding NDI. The receiver may further distinguish between recoverable and unrecoverable synchronization errors, and limit transmission of the RESET message to situations where the protocol synchronization error is unrecoverable.

Another embodiment of the present invention prevents protocol synchronization errors by sending subsequent explicit scheduling grants for each PDU. Each time the receiver successfully receives a PDU, the receiver sends a subsequent explicit scheduling grant to the transmitter to explicitly authorize the transmitter to send the next PDU. The transmitter will not send the next PDU unless it receives the subsequent explicit scheduling grant. In some embodiments, the subsequent explicit scheduling grant may include an indicator that indicates to the transmitter whether the next transmission should comprise a retransmission of a current PDU or a transmission of a new PDU.

DETAILED DESCRIPTION

The present invention is described herein in the context of a transmitter and a receiver in a wireless communication system that relies on retransmission protocols, such as HARQ protocols. The transmitter and/or receiver described herein may be disposed in a mobile station, a base station, or other network entity. The wireless system operates according to a predefined communication protocol, including but not limited to, UMTS, GSM, etc.

Figure 1:
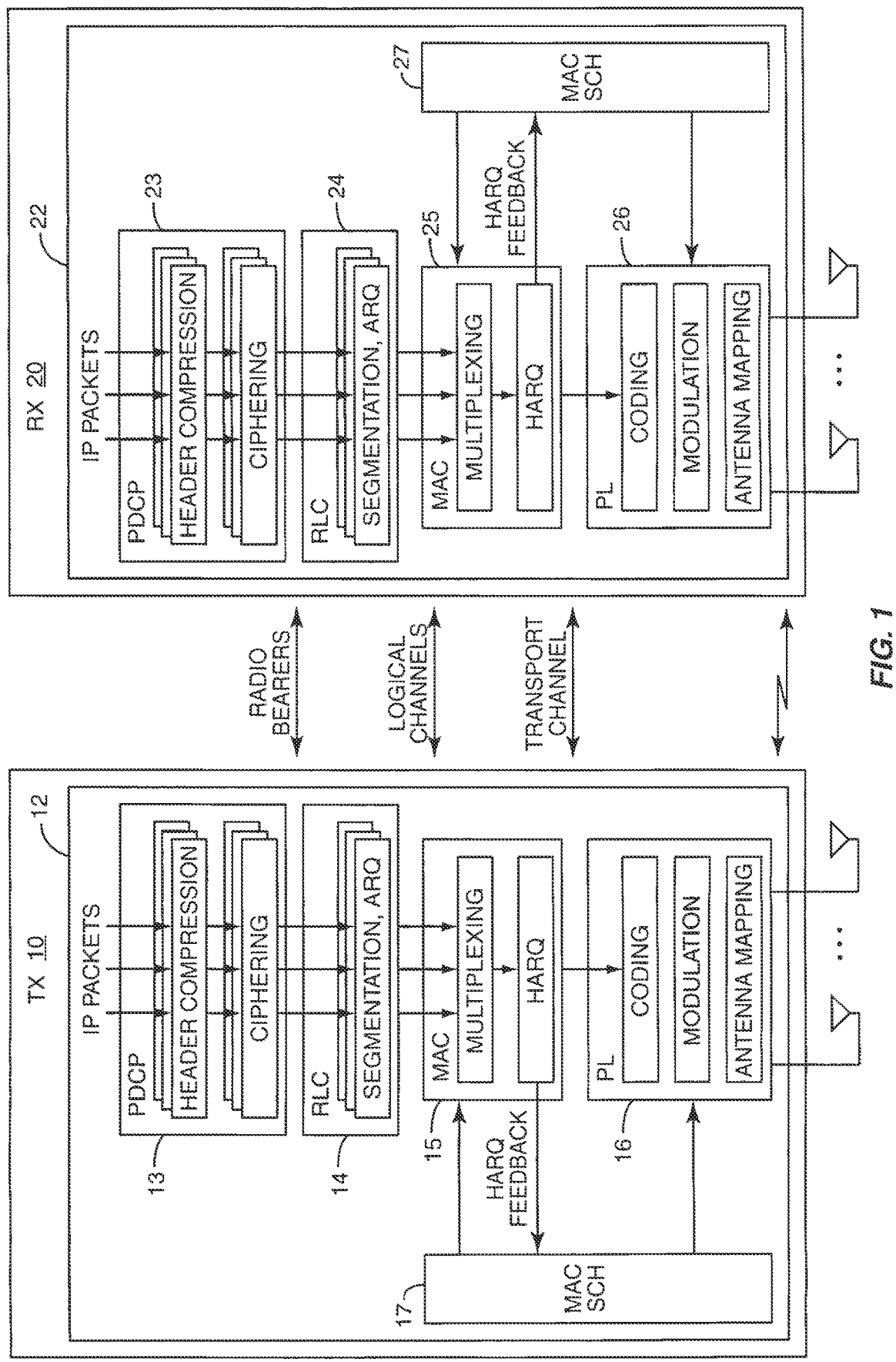
FIG. 1 shows an exemplary wireless transmitter in communication with a wireless receiver.

FIG. 1 illustrates an exemplary transmitter 10 for transmitting protocol data units (PDUs) to a receiver 20. The various blocks in FIG. 1 represent functions of the transmit processor and receive processor. Some functions not material to the present invention have been omitted for the sake of clarity. Thus, other functions may be present in addition to those illustrated in FIG. 1. The illustrated functions can be implemented in one or more microprocessors, microcontrollers, hardware, or a combination thereof. The following describes the various blocks in terms of the transmit processor 12. However, it will be appreciated that the same functions may be implemented by the receive processor 22.

Transmit processor 12 includes a Packet Data Convergence Protocol (PDCP) module 13, a Radio Link Control (RLC) module 14, a Medium Access Control (MAC) module 15, a Physical Layer (PL) module 16, and a MAC scheduler 17. Data to be transmitted in the form of IP packets enters the PDCP module 13 where the IP headers may be compressed to reduce the number of bits transmitted over the air interface. The PDCP module 13 also performs ciphering and deciphering of the IP packets for security. The RLC module 14 ensures almost error free, in sequence delivery of packets to higher layers, which is needed for certain types of communication. The RLC module 14 performs segmentation/concatenation, and handles retransmission of erroneously received packets. The IP packets from the PDCP module 13 are used to create RLC PDUs, which may comprise divided (segmented) IP packets, concatenated IP packets, or a single IP packet. The MAC module 15 offers services to the RLC module 14 in the form of logical channels. The MAC module 15 maps data received on various logical channels from the RLC module 14 to corresponding transport channels. The MAC scheduler 17 is responsible for uplink and downlink scheduling, which typically occurs at the base station. According to the present invention, the MAC scheduler 17 also receives feedback from the Hybrid ARQ (HARQ) protocol process, as described in more detail below. Transport blocks are fed by the MAC module 15 to the PL module 16. The PL module 16 handles coding/decoding, modulation/demodulation, interleaving, and spreading prior to transmission of one or more PDUs. As used herein, a PDU represents a block of data including both a body and a header. The PDU comprises a MAC PDU, and may comprise a single block of data, a segmented block of data, or a multiple concatenated blocks of data.

WCDMA and LTE systems employ HARQ in the MAC module 15, 25 to handle errors that occur during transmission. In broad terms, the HARQ protocol enables the receiver 20 to request retransmission of erroneously received PDUs. According to the HARQ protocol, the receive processor 22 sends an HARQ feedback message on a control channel to the transmitter 10 to indicate whether a current PDU was successfully received by the receiver 20. For example, when the receiver 20 successfully receives the PDU, the receive processor 22 sends an ACK message to the transmitter 10. In response to the ACK message, the transmit processor 12 transmits the succeeding PDU. When the receiver 20 does not successfully receive the PDU, the receive processor 22 sends a NACK message to the transmitter 10 to request that the transmit processor 12 retransmit the current PDU. As discussed above, when the ACK or NACK feedback message is misinterpreted at the transmitter 10, the subsequently transmitted PDU may differ from that expected by the receiver 20, which leads to link layer protocol synchronization errors.

One conventional wireless system attempts to address this problem using a new data indicator (NDI). The NDI is associated with a PDU, but is generally transmitted separately from the PDU on an uplink control channel. For 3GPP LTE, the transmitter 10 may transmit the NDI on a physical downlink control channel (PDCCH). This enables the receiver to interpret the NDI even when the receiver cannot decode the received PDU. The NDI may comprise a single bit that toggles each time a new PDU is transmitted from the transmitter to the receiver. Alternatively, the NDI may comprise multiple bits, where the same predetermined value is used each time the transmitter transmits a new PDU. It will be appreciated that the following description applies to both single-bit and multiple bit NDIs.

Figure 2:
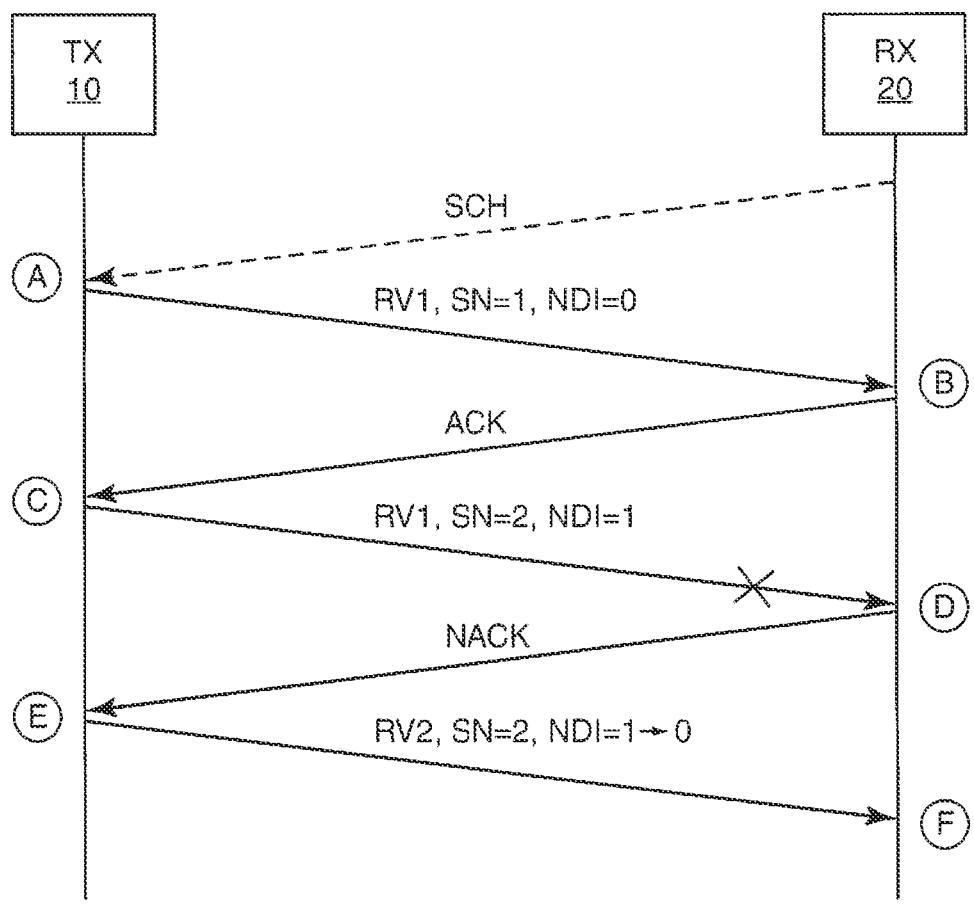
FIG. 2 shows a conventional packet data communication between the transmitter and the receiver.

FIG. 2 illustrates one example of a packet data communication between a transmitter and a receiver that uses a one-bit NDI to facilitate protocol synchronization. After the transmitter sends a buffer status report to the receiver, the receiver sends a scheduling grant to the transmitter (A) on a downlink control channel, such as the PDCCH. The scheduling grant comprises a multiple bit message with error protection, such as CRC, that identifies the transmitter, any retransmission protocols, such as HARQ, and the allocated wireless resources for transmitting the PDUs, such as modulation, data rate, etc. In response to the scheduling grant, the transmitter transmits a PDU with sequence number (SN)=1, redundancy version (RV) 1, and NDI=0. At (B), the receiver successfully decodes the received PDU, and sends an ACK to the transmitter (C). Subsequently, the transmitter transmits a second PDU with RV1, SN=2, and NDI=1 (D). At (D), the receiver cannot decode the second PDU, and sends a NACK to the transmitter (E). In response, the transmitter retransmits the SN=2 PDU with RV2 and NDI=1. However, during transmission, the NDI value toggles to NDI=0. While the receiver recognizes that the NDI value does not match the expected NDI value, the receiver assumes the new NDI value was caused by an ACK/NACK error, and therefore, assumes the received PDU is a third PDU instead of a retransmission of the second PDU. Thus, the link layer protocol synchronization between the receiver and transmitter has been lost.

One embodiment of the present invention addresses this problem by detecting loss of synchronization and restoring synchronization by sending an explicit RESET message to the transmitter 10. The RESET message may comprise a 1-bit message that is CRC protected and sent on a downlink channel, such as the PDCCH, as part of a MAC control unit. In response to receiving the RESET message, the transmitter aborts transmission of a current PDU and transmits a new PDU and corresponding NDI. Because the receiver 20 expects a new PDU and new NDI after sending the RESET message to the transmitter 10, the RESET message successfully restores protocol synchronization between the transmitter 10 and the receiver 20.

Figure 3A:
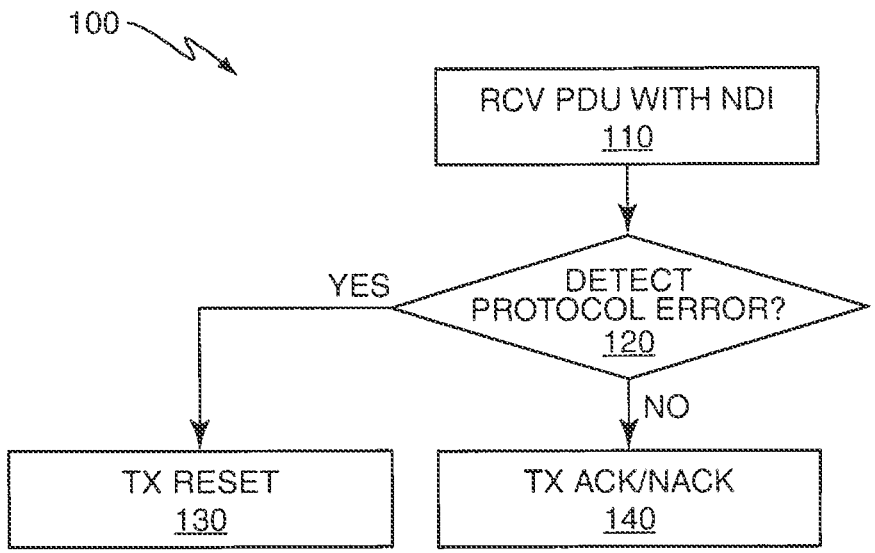
FIGS. 3A and 3B show process diagrams for one exemplary NDI-based synchronization process according to the present invention.
Figure 3B:
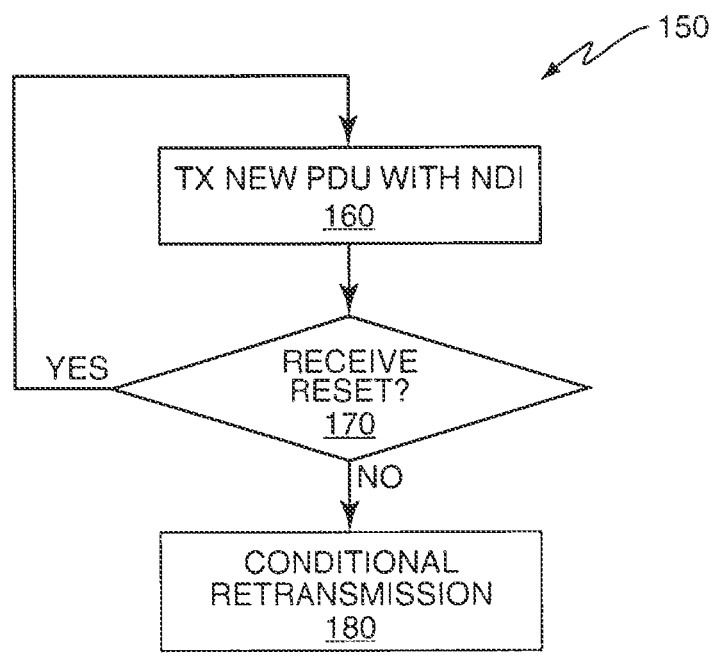

FIGS. 3A and 3B show exemplary synchronization correction processes 100 and 150 for a receiver 20 and transmitter 10, respectively, for a retransmission protocol according to the present invention. As shown in FIG. 3A, the receiver 20 receives a first PDU and a corresponding NDI (block 110). The receive processor 22 evaluates the received NDI to determine if a protocol synchronization error has occurred. When a protocol synchronization error is detected (block 120), the receiver 20 transmits a RESET message to the transmitter 10 (block 130). If no protocol synchronization error is detected (block 120), the receiver 20 transmits an ACK/NACK message to the transmitter 10 (block 140). As shown in FIG. 3B, transmitter 10 transmits the first PDU with the predetermined NDI (block 160). If the transmitter 10 receives a RESET message (block 170), the transmitter 10 abandons the first PDU and transmits a second PDU with a new NDI (block 160). If the transmitter 10 does not receive a RESET message (block 170), the transmitter 10 implements conditional retransmission operations based on the received ACK/NACK message (block 180).

A modified version of this embodiment distinguishes between recoverable and unrecoverable protocol synchronization errors, and limits transmission of the RESET message to situations where the protocol synchronization error comprises an unrecoverable error. To that end, the receiver 20 first determines the type of protocol synchronization error. When the protocol synchronization error comprises a recoverable error, the receive processor 22 in the receiver 20 corrects the error at the receiver 20 and continues with normal operations. When the protocol synchronization error comprises an unrecoverable error, the receive processor 22 sends the RESET message to the transmitter 10.

Figure 4:
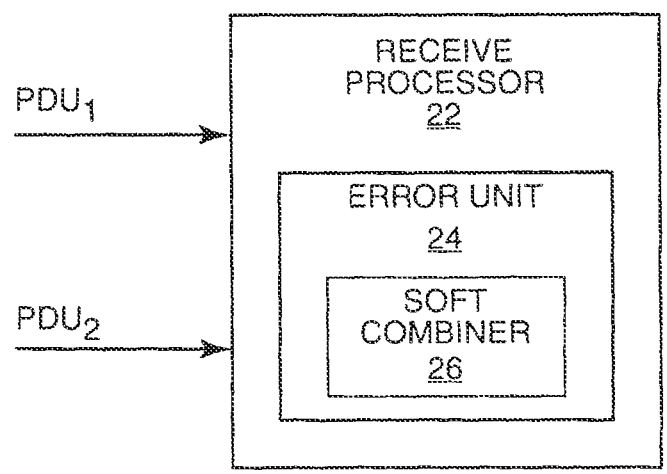
FIG. 4 shows a block diagram of an exemplary receive processor.

FIG. 4 shows one exemplary receive processor 22 comprising an error unit 24 for determining the type of protocol synchronization error. The error unit 24 processes a current PDU with a previously received PDU to determine the type of protocol synchronization error. In one embodiment, the current and previously received PDUs comprise sequentially received PDUs. In one embodiment, error unit 24 comprises a soft combiner 26 that soft combines the current PDU with the previously received PDU. Based on the received NDI, the expected NDI, and whether or not the soft combined PDUs are decodable, the receive processor 22 determines whether the protocol synchronization error is recoverable or unrecoverable. Table 1 shows exemplary scenarios for determining the type of protocol synchronization error.

TABLE 1

| NDI Previously Received | NDI Currently Received | Expected NDI | Soft Combination Result | Error Type |
| --- | --- | --- | --- | --- |
| 0 | 0 | 1 | Decodable | Recoverable ACK/NACK Error |
|   |   |   | Not Decodable | Recoverable NDI Error |
| 0 | 1 | 0 | Decodable | Recoverable NDI Error |
|   |   |   | Not Decodable | Unrecoverable ACK/NACK Error |

Figure 5A:
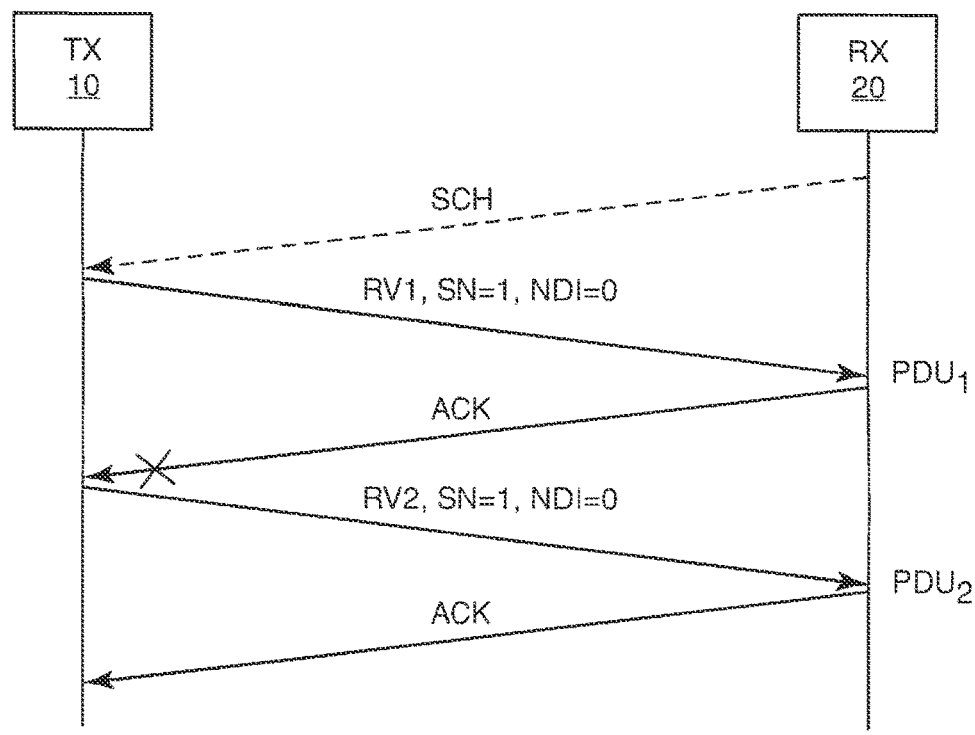
FIGS. 5A-5D show exemplary packet data communications between the transmitter and the receiver for the NDI-based synchronization process of FIGS. 3A and 3B.

FIGS. 5A-5D illustrate examples of the various scenarios shown in Table 1 for detecting and correcting recoverable and unrecoverable protocol synchronization errors according to the present invention. In FIG. 5A, receiver 20 successfully receives $PDU_1$ and the corresponding NDI=0. However, the transmitter 10 incorrectly interprets the ACK sent by the receiver 20 as a NACK. As such, $PDU_2$ transmitted by transmitter 10 comprises a retransmitted version of $PDU_1$ with NDI=0. Because the receiver 20 is expecting a new PDU, the receiver expects the NDI to toggle from 0 to 1. However, the receive processor 22 notes that the received NDI=0, and therefore, recognizes that either a recoverable ACK/NACK or a recoverable NDI error has occurred. To determine the error type, the error unit 24 soft combines $PDU_1$ and $PDU_2$ based on the expected type of redundancy used to retransmit $PDU_1$ as $PDU_2$. Because the resulting soft combination is decodable, the receive processor 22 determines that the protocol synchronization error comprises a recoverable ACK/NACK error. To restore protocol synchronization, the receive processor 22 retransmits an ACK to the transmitter 10. The receiver 20 subsequently processes $PDU_1$, $PDU_2$, or some combination thereof according to conventional techniques to recover the corresponding data. While not required, it will be appreciated that the receive processor 22 may alternatively transmit a RESET message to the transmitter 10.

Figure 5B:
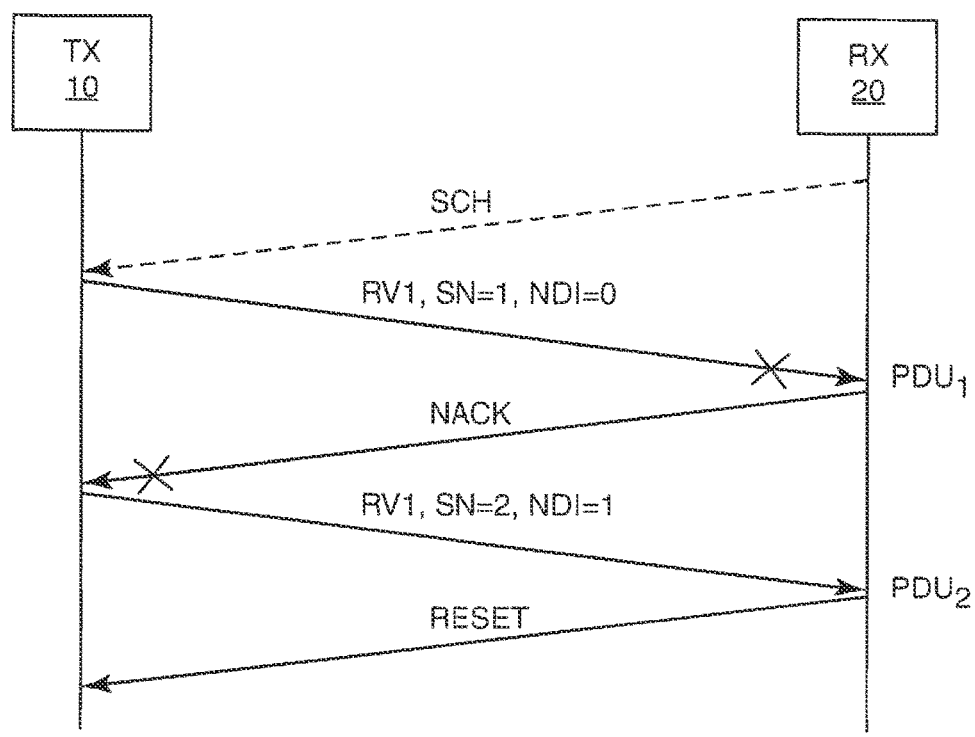

In FIG. 5B, receiver 20 does not successfully receive $PDU_1$, and therefore, sends a NACK to the transmitter 10. The transmitter 10 incorrectly interprets the NACK as an ACK, and transmits a new PDU ($PDU_2$) with NDI=1. Because the received NDI=1 differs from the expected NDI=0, the receive processor 22 recognizes that either an unrecoverable ACK/NACK or a recoverable NDI error has occurred. The error unit 24 soft combines $PDU_1$ and $PDU_2$. Because the resulting soft combination is not decodable, the receive processor 22 determines that the protocol synchronization error comprises an unrecoverable ACK/NACK error. To restore protocol synchronization, the receive processor 22 transmits a RESET message to transmitter 10.

Figure 5C:
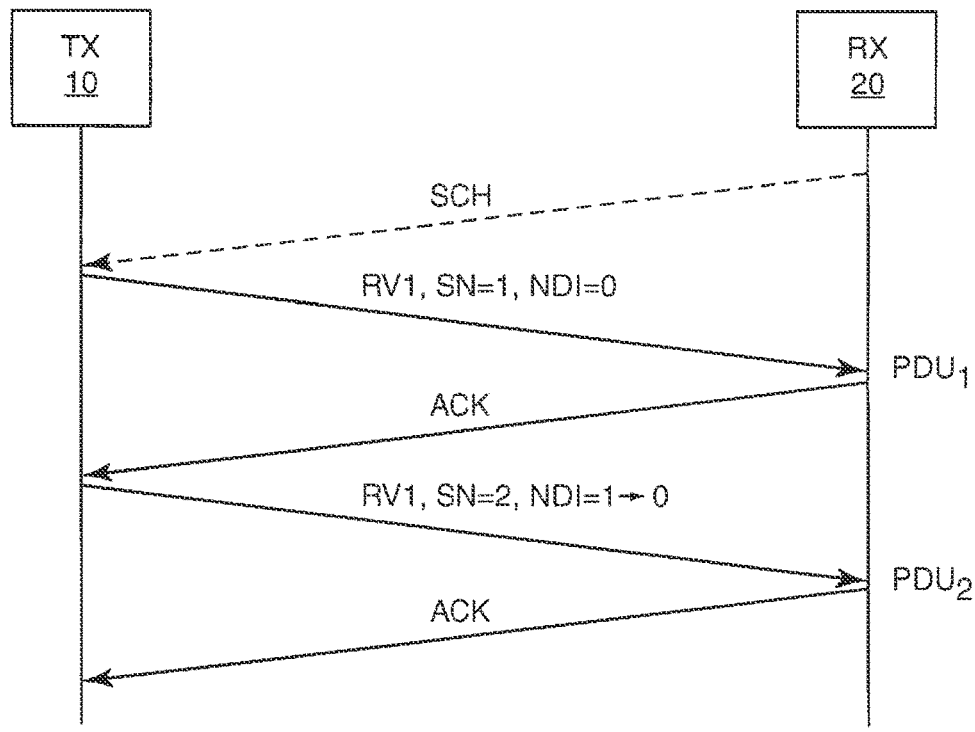

In FIG. 5C, receiver 20 successfully receives $PDU_1$ and the corresponding NDI=0, and the transmitter 10 correctly interprets the ACK sent by the receiver 20. As such, the transmitter 10 transmits a new PDU ($PDU_2$) with NDI=1. The transmitted NDI toggles during transmission, causing the received NDI to equal 0. Because the receiver 20 is expecting a new PDU, the receiver expects the NDI to equal 1. However, the receive processor 22 notes that the received NDI=0, and therefore, recognizes that either a recoverable ACK/NACK or a recoverable NDI error has occurred. The error unit 24 soft combines $PDU_1$ and $PDU_2$. Because the resulting soft combination is not decodable, the receive processor 22 determines that the protocol synchronization error comprises a recoverable NDI error. To restore protocol synchronization, the receive processor 22 resets the NDI value to 1 at the receiver 20, transmits an ACK to the transmitter 10, and processes the received $PDU_2$ using conventional decoding techniques.

Figure 5D:
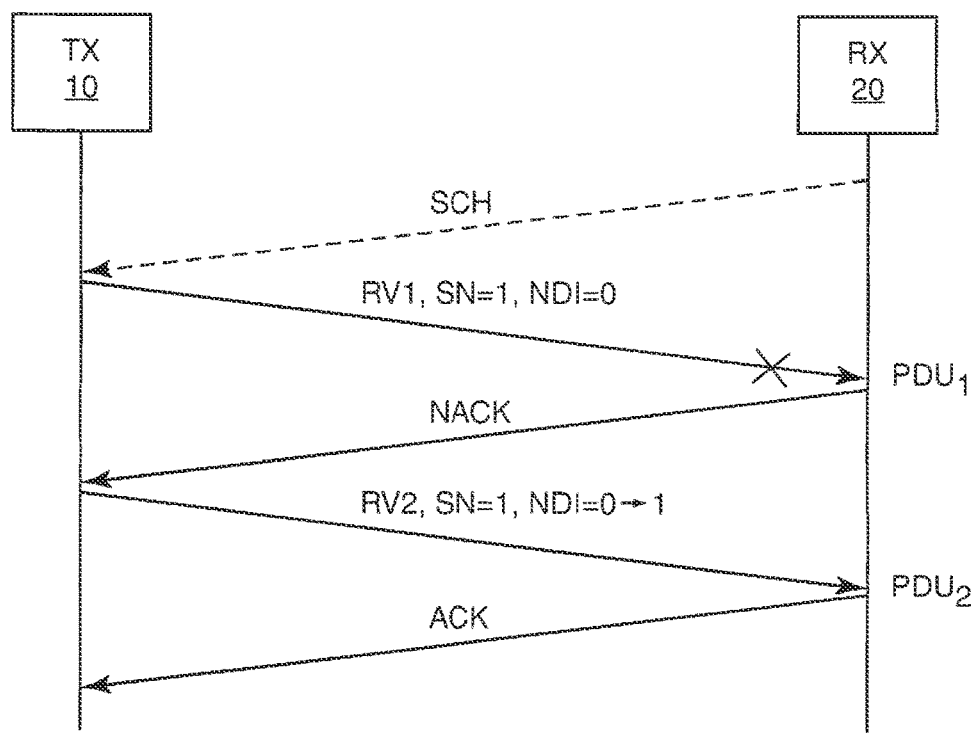

In FIG. 5D, receiver 20 does not successfully receive $PDU_1$, and therefore sends a NACK to the transmitter 10. In response, transmitter 10 retransmits version 2 of $PDU_1$ ($PDU_2$) with NDI=0. The transmitted NDI toggles during transmission, causing the received NDI to equal 1. Because the received NDI=1 differs from the expected NDI=0, the receive processor 22 recognizes that either an unrecoverable ACK/NACK or a recoverable NDI error has occurred. The error unit 24 soft combines $PDU_1$ and $PDU_2$. Because the resulting soft combination is decodable, the receive processor 22 determines that the protocol synchronization error comprises a recoverable NDI error. To restore protocol synchronization, the receive processor 22 resets the NDI value to 0 at the receiver 20, transmits an ACK to the transmitter 10, and processes the received $PDU_1$ combined with $PDU_2$ using conventional decoding techniques.

The above illustrates how sequentially received PDUs and their corresponding NDIs may be used to identify and correct a single protocol synchronization error. For multiple protocol synchronization errors, e.g., an ACK/NACK error coupled with an NDI error, the error unit 24 may process three or more received PDUs to identify each protocol synchronization error.

Another embodiment of the present invention eliminates the NDI and prevents protocol synchronization errors using subsequent explicit scheduling grants. More particularly, when the transmitter 10 receives a scheduling grant, the transmitter 10 transmits only the one PDU. The HARQ unit in the MAC module 15 evaluates the received PDU for errors and sends HARQ feedback information to the MAC scheduler 17. The MAC scheduler 27 in the receive processor 22 sends a subsequent explicit scheduling grant to the transmitter 10 based on the error evaluation. For example, when the receiver 20 successfully receives a PDU, the receiver 20 sends a subsequent explicit scheduling grant to the transmitter 10 to authorize the transmitter 10 to transmit the next PDU. Because scheduling grants comprise multiple bit messages that include error protection, such as CRC, they are not as susceptible to errors as single bit ACK messages. Thus, using subsequent explicit scheduling grants for each PDU significantly reduces the protocol synchronization errors associated with misinterpreted ACK/NACK messages. Further, using the explicit scheduling grants eliminates data associated uplink control signaling, such as NDIs.

Figure 6A:
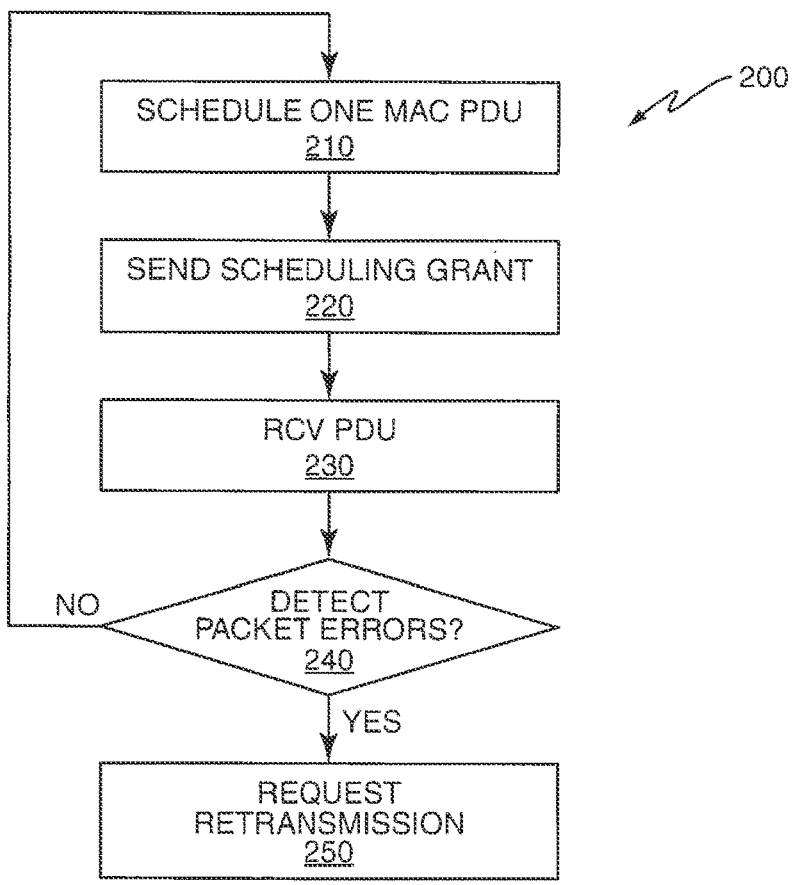
FIGS. 6A and 6B show process diagrams for one exemplary NDI-less synchronization process according to the present invention.
Figure 6B:
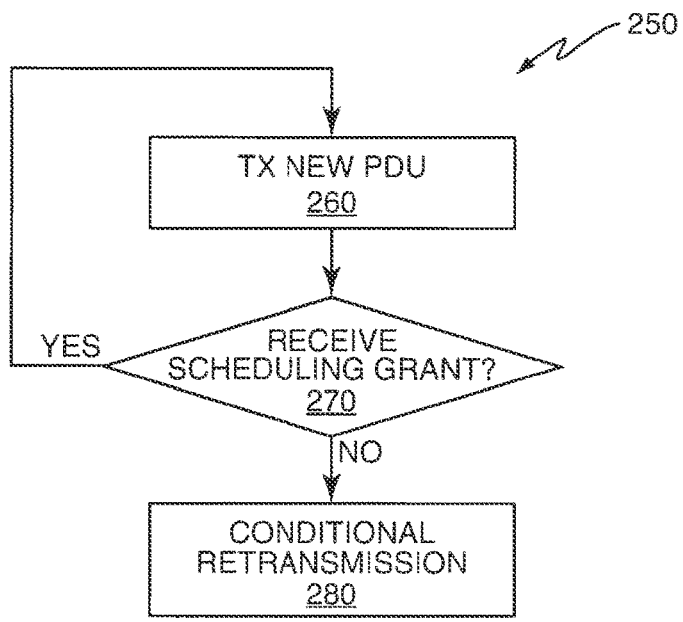

FIGS. 6A and 6B show exemplary HARQ processes 200 and 250 for the receiver 20 and transmitter 10, respectively, according to this embodiment. As shown in FIG. 6A, the receiver 20 schedules one MAC PDU (block 210) and sends the corresponding scheduling grant to the transmitter 10 (block 220) as discussed above. The receiver 20 receives the PDU (block 230) responsive to the explicit scheduling grant. When an error is detected in the received PDU (block 240), the receiver 20 requests retransmission, e.g., transmits a NACK message to the transmitter 10 (block 250). If no errors are detected (block 240), the receiver 20 schedules another PDU (block 210) and sends a subsequent explicit scheduling grant to the transmitter 10 (block 220) to authorize the transmission of the next PDU. While not required, the receiver 20 may also transmit an ACK message to the transmitter 10. However, an ACK message does not authorize transmission of the next PDU unless the ACK message is accompanied by the subsequent explicit scheduling grant. As shown in FIG. 6B, the transmitter 10 transmits a PDU responsive to an explicit scheduling grant (block 260). Before transmitting the next PDU, the transmitter 10 waits for an explicit scheduling grant. If the transmitter 10 receives a subsequent explicit scheduling grant (block 270), the transmitter 10 transmits the next PDU (block 260). If the transmitter 10 does not receive the subsequent explicit scheduling grant (block 270), the transmitter 10 may implement conditional retransmission operations based on the received ACK/NACK message (block 280), as discussed further below.

Figure 7A:
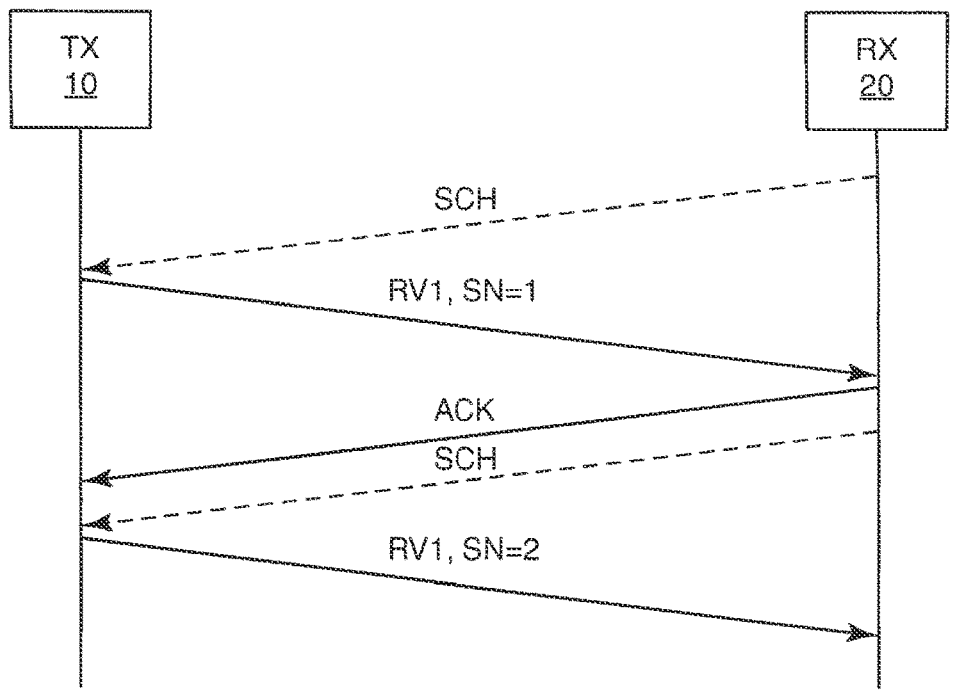
FIGS. 7A-7E show exemplary packet data communications between the transmitter and the receiver for the NDI-less synchronization process of FIGS. 6A and 6B.

FIGS. 7A-7D illustrate multiple scenarios for sending successive PDUs using subsequent explicit scheduling grants. In FIG. 7A, transmitter 10 transmits redundancy version 1 of a PDU responsive to an explicit scheduling grant. The receiver 20 successfully receives the PDU, and therefore, sends the subsequent explicit scheduling grant and sends an ACK message to the transmitter 10. After correctly interpreting the explicit scheduling grant, transmitter 10 transmits version 1 of the next PDU.

Figure 7B:
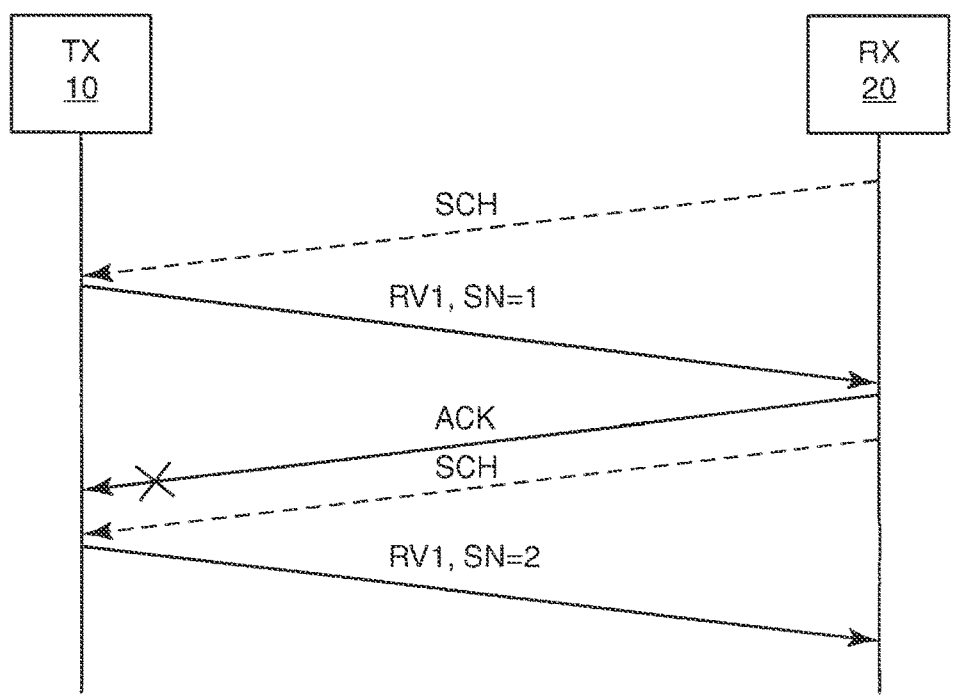

In FIG. 7B, transmitter 10 transmits redundancy version 1 of a PDU responsive to an explicit scheduling grant. The receiver 20 successfully receives the PDU, and therefore, sends a subsequent explicit scheduling grant and sends an ACK message to the transmitter 10. The transmitter 10 incorrectly interprets the ACK sent by the receiver 20 as a NACK, and therefore, the received HARQ feedback message is inconsistent with the received scheduling grant. In this case, the explicit scheduling grant overrides the HARQ feedback message, and the transmitter 10 transmits version 1 of the next succeeding PDU. Because the scheduling grant has better error protection than an ACK/NACK signal, the use of the scheduling grant to trigger the transmission of a succeeding PDU avoids the protocol synchronization problems associated with the misinterpreted ACK message.

Figure 7C:
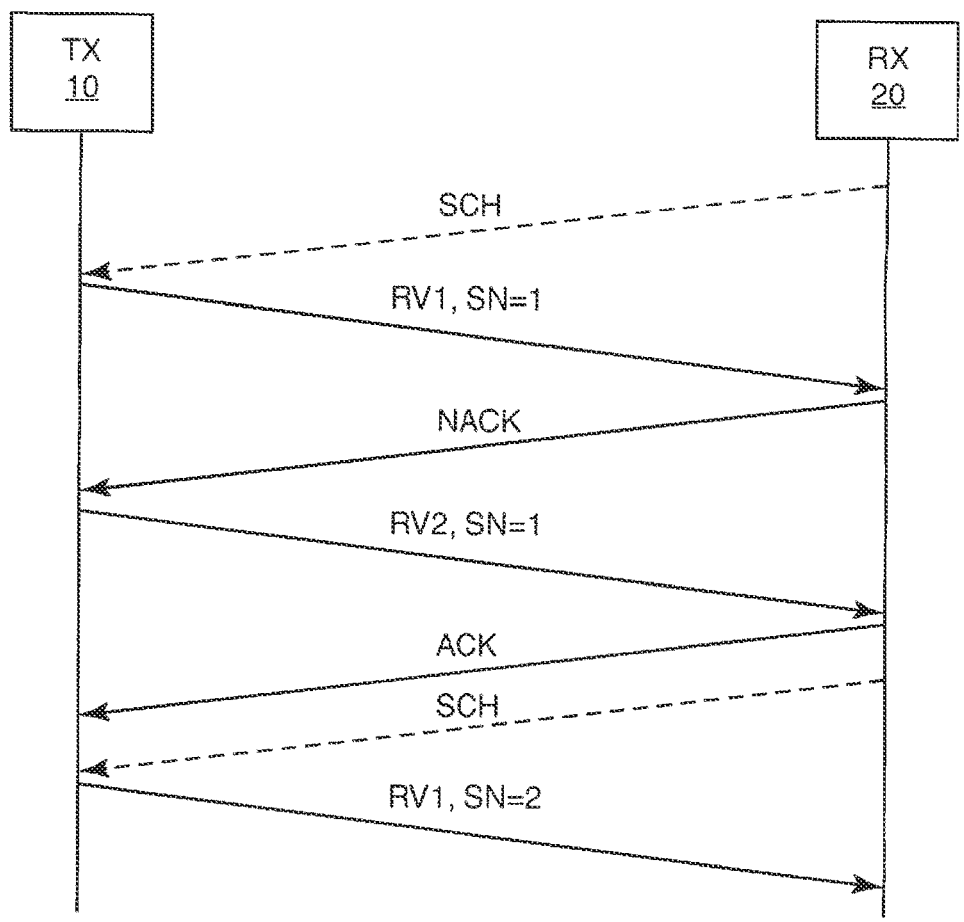

In FIG. 7C, transmitter 10 transmits redundancy version 1 of a PDU responsive to an explicit scheduling grant. The receiver 20 does not successfully receive the PDU, and therefore, sends a NACK message to the transmitter 10. In response, the transmitter 10 retransmits redundancy version 2 of the PDU. The receiver 20 successfully receives the retransmitted PDU, and therefore, sends a subsequent explicit scheduling grant and an ACK message to the transmitter 10. The transmitter 10 correctly interprets the subsequent explicit scheduling grant, and therefore, transmits redundancy version 1 of the next PDU to the receiver 20.

Figure 7D:
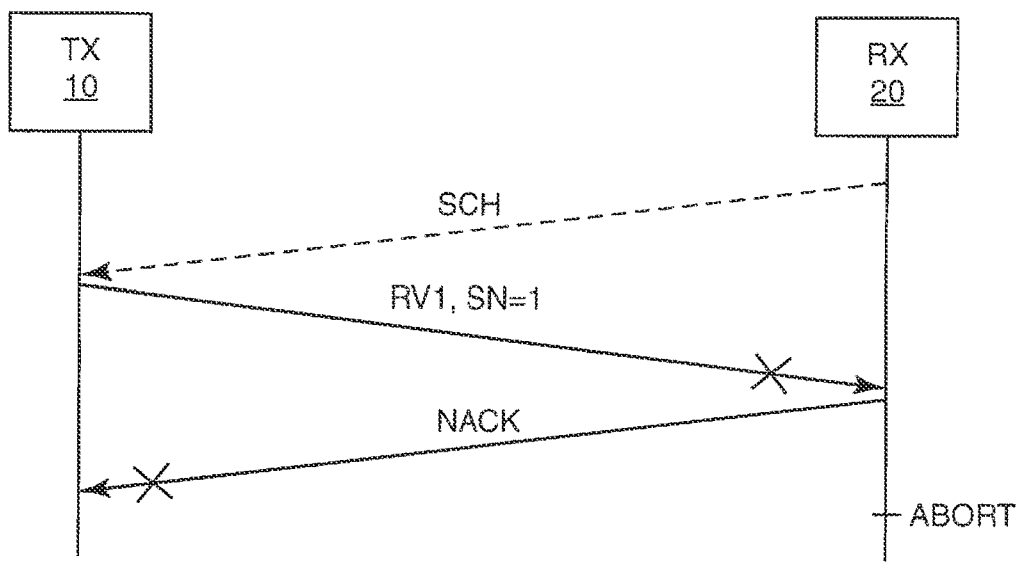
Figure 7E:
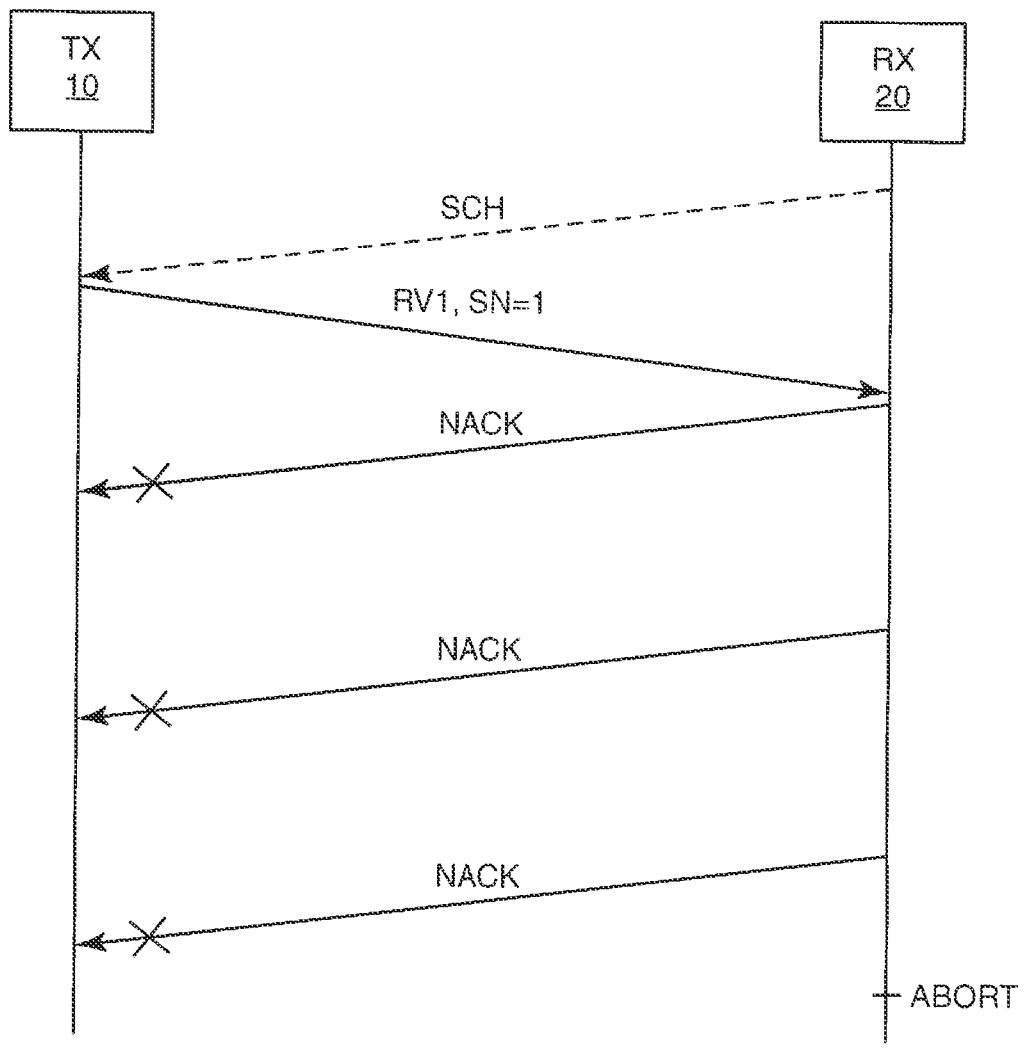

FIGS. 7D and 7E illustrate how the scheduling grant embodiment may handle an incorrectly interpreted NACK message. Transmitter 10 transmits redundancy version 1 of a PDU responsive to an explicit scheduling grant. The receiver 20 does not successfully receive the PDU, and therefore, sends a NACK message to the transmitter 10. Transmitter 10 incorrectly interprets the NACK message as an ACK message. However, because transmitter 10 did not receive a subsequent explicit scheduling grant, the transmitter 10 does not send the next PDU. As shown in FIG. 7D, when receiver 20 fails to receive the expected retransmission, the receiver 20 may abort all processing operations associated with the current PDU. Alternatively, the receiver 20 may send additional NACK messages, as shown in FIG. 7E. If the receiver 20 fails to receive a retransmission after sending some predetermined number of NACK messages, the receiver 20 may abort all processing operations associated with the current PDU.

In some embodiments, subsequent explicit scheduling grants may be used to explicitly request retransmission of a current PDU. The subsequent explicit scheduling grants may include an indicator that indicates whether the transmitter 10 should transmit the next PDU or should retransmit a current PDU. In this embodiment, the transmitter 10 either transmits a new PDU or a retransmitted version of a current PDU based on the value of the indicator, regardless of the presence of an ACK or a NACK. In one example, the subsequent explicit scheduling grants may include a redundancy version (RV) indicator that indicates a request for a succeeding PDU transmission when RV=1, and indicates a request for retransmission when RV 2. Alternatively, the subsequent explicit scheduling grants may include a single-bit or multi-bit transmission flag that indicates a request for the next PDU transmission when the flag is set to a first predetermined value, and indicates a request for a retransmission when the flag is set to a different predetermined value. For example, the subsequent explicit scheduling grants may include a New Data Flag (NDF), where NDF=1 indicates a request for the next PDU transmission while NDF=0 indicates a request for a retransmission of a current PDU. It will be appreciated that the exemplary list of indicators discussed above is not exhaustive.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method for Hybrid Automatic Repeat Request (HARQ) link layer protocol synchronization for an uplink transmission between a user equipment and a radio network node in a wireless communication system, the method comprising:

transmitting, between the user equipment and the radio network node, a first protocol data unit in response to receiving, by the user equipment, an explicit scheduling grant, evaluating, by the radio network node, the transmitted first protocol data unit for errors, transmitting, between the radio network node and the user equipment, a HARQ feedback message for the transmitted first protocol data unit based on the error evaluation and transmitting, between the radio network node and the user equipment, a subsequent scheduling grant, transmitting, between the user equipment and the radio network node, a subsequent second protocol data unit distinct from the first protocol data unit in response to a subsequent explicit scheduling grant received, by the user equipment, in addition to the HARQ feedback message, wherein the subsequent explicit scheduling grant indicates to the user equipment to be authorized for transmitting the second protocol data unit, and re-transmitting, between the user equipment and the radio network node, the first protocol data unit in absence of receiving, by the user equipment, a subsequent explicit scheduling grant upon the user equipment interpreting the HARQ feedback message as a negative acknowledgement for the transmitted first protocol data unit.

2. The method according to claim 1, wherein the HARQ feedback message is a positive acknowledgment for the transmitted first protocol data unit.

3. The method according to claim 1, the method further comprising:

transmitting, between the radio network node and the user equipment, a further HARQ feedback message for the first protocol data unit, interpreting, by the user equipment, the further HARQ feedback message as a positive acknowledgement for the transmitted first protocol data unit, and waiting, by the user equipment, for the subsequent explicit scheduling grant before the user equipment transmitting the second protocol data unit.

4. The method according to claim 1, wherein successive protocol data units are transmitted between the radio network node and the user equipment in response to the user equipment receiving subsequent explicit scheduling grants.

5. The method according to claim 1, wherein each protocol data unit is transmitted between the user equipment and the radio network node one at a time in response to the user equipment receiving a scheduling grant.

6. The method according to claim 1, wherein the step of transmitting a subsequent second protocol data unit is performed upon the user equipment interpreting the HARQ feedback message as a negative acknowledgement for the transmitted first protocol data unit.

7. The method according to claim 1, wherein the transmitted first protocol data unit has a redundancy version of one, wherein the re-transmitted first protocol data unit has a redundancy version of two, and/or wherein the transmitted second protocol data unit has a redundancy version of one.

8. The method according to claim 1, wherein the method applies to one HARQ process.

9. The method according to claim 1, wherein the subsequent explicit scheduling grant is transmitted when no errors are detected, by the radio network node, in the transmitted first protocol data unit.

10. The method according to claim 1, the method further comprising:

transmitting, between the radio network node and the user equipment, a further HARQ feedback message for a transmitted further protocol data unit based on an error evaluation performed by the radio network node, wherein the further HARQ feedback message is a negative acknowledgement for the transmitted further protocol data unit;

detecting, by the radio network node, that a re-transmitted further protocol data unit is not received in response to the transmitted further HARQ feedback message; and aborting, by the radio network node, processing operations for the transmitted further protocol data unit.

11. The method according to claim 1, the method further comprising:

transmitting, between the radio network node and the user equipment, a plurality of subsequent further HARQ feedback messages for a transmitted further protocol data unit based on an error evaluation performed by the radio network node, wherein each of the subsequent further HARQ feedback messages is a negative acknowledgement for the transmitted further protocol data unit;

detecting, by the radio network node, that a re-transmitted further protocol data unit is not received in response to the transmitted further HARQ feedback messages; and aborting, by the radio network node, processing operations for the transmitted further protocol data unit.

* * * * *

UNITED STATES PATENT AND TRADEMARK OFFICE
CERTIFICATE OF CORRECTION

PATENT NO. : 11,849,017 B2
APPLICATION NO. : 17/301424
DATED : December 19, 2023
INVENTOR(S) : Peisa et al.

Page 1 of 1

It is certified that error appears in the above-identified patent and that said Letters Patent is hereby corrected as shown below:

On the Title Page

On Page 2, Item (56), under "OTHER PUBLICATIONS", in Column 2, Line 6, delete "(3GPP),Mobile" and insert -- (3GPP), Mobile --, therefor.

On Page 2, Item (56), under "OTHER PUBLICATIONS", in Column 2, Line 8, delete "Greece," and insert -- Greece; --, therefor.

On Page 2, Item (56), under "OTHER PUBLICATIONS", in Column 2, Line 32, delete "(3GPP),Mobile" and insert -- (3GPP), Mobile --, therefor.

On Page 2, Item (56), under "OTHER PUBLICATIONS", in Column 2, Line 46, delete "Centre ;" and insert -- Centre; --, therefor.

On Page 2, Item (56), under "OTHER PUBLICATIONS", in Column 2, Line 52, delete "(3GPP),Mobile" and insert -- (3GPP), Mobile --, therefor.

On Page 2, Item (56), under "OTHER PUBLICATIONS", in Column 2, Line 53, delete "Centre ;" and insert -- Centre; --, therefor.

In the Specification

In Column 1, Line 5, delete "2018," and insert -- 2018, now Pat. No. 10,992,448, --, therefor.

In Column 6, Line 48, delete "the one" and insert -- one --, therefor.

In Column 6, Line 64, delete "associated" and insert -- associated with --, therefor.

In Column 8, Line 26, delete "RV 2." and insert -- $R \geq 2$. --, therefor.

Signed and Sealed this
Nineteenth Day of March, 2024

Katherine Kelly Vidal
*Director of the United States Patent and Trademark Office*